United States Patent [19]

Solomon

[11] 4,304,469
[45] Dec. 8, 1981

[54] EYEGLASS FRAME HAVING REMOVABLE LENSES

[76] Inventor: Charles I. Solomon, P.O. Box 12495, San Antonio, Tex. 78212

[21] Appl. No.: 124,541

[22] Filed: Feb. 25, 1980

[51] Int. Cl.³ .......................... G02C 1/00; G02C 5/14
[52] U.S. Cl. ........................................ 351/121; 351/86
[58] Field of Search ................... 351/86, 121, 92, 106, 351/47, 48; 2/441, 443

[56] References Cited

U.S. PATENT DOCUMENTS

| | | | |
|---|---|---|---|
| 1,308,477 | 7/1919 | Blanchard | 351/86 |
| 2,652,746 | 9/1953 | Shanks | 351/86 |
| 2,738,709 | 3/1956 | Matthews et al. | 351/86 |
| 3,427,098 | 2/1969 | Johnston | 351/86 |
| 4,176,921 | 12/1979 | Matthias | 351/106 |

FOREIGN PATENT DOCUMENTS

| | | | |
|---|---|---|---|
| 1055825 | 2/1954 | France | 351/86 |
| 1190806 | 4/1959 | France | 351/86 |

Primary Examiner—John K. Corbin
Assistant Examiner—Rodney B. Bovernick
Attorney, Agent, or Firm—Gunn, Lee & Jackson

[57] ABSTRACT

An eyeglass frame having removable lenses consisting of lens rings to which are secured fixed inner, upper, and lower lens hooks receiving a removable lens. The frames may be utilized for interchangeable prescription, non-prescription, safety glasses and sunglasses. A movable temple lens latch completes the retention means for retaining the lenses in the eyeglass frame. Five species of temple lens latches are visualized. The preferred species is a tiltable catch. Other species visualized are spring loaded projection, frictional slide projection, a swing projecting arm, and detachable retention pins.

3 Claims, 13 Drawing Figures

U.S. Patent    Dec. 8, 1981    Sheet 1 of 2    4,304,469
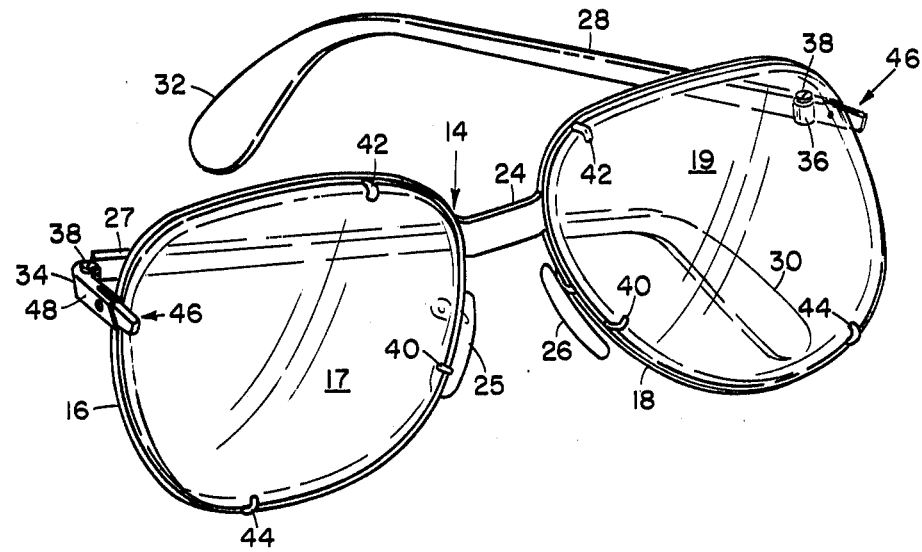
FIG. 1
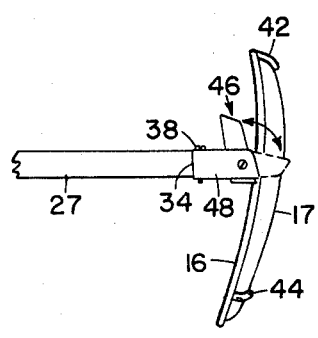
FIG. 2
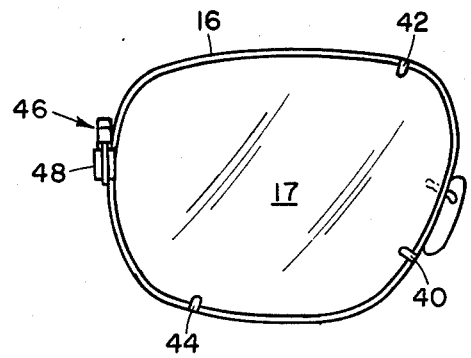
FIG. 3
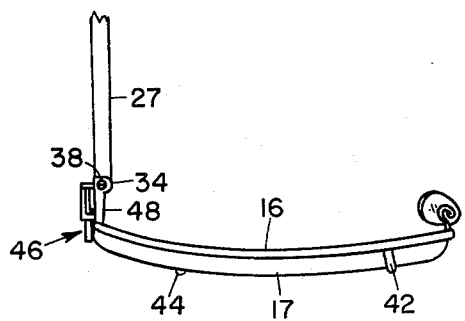
FIG. 5
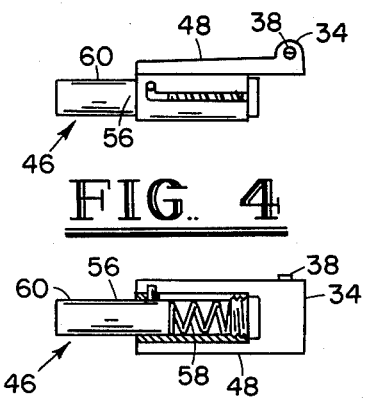
FIG. 4
FIG. 6

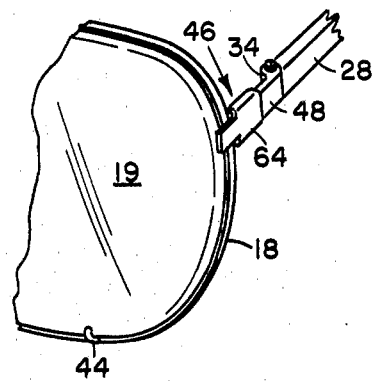
FIG. 7
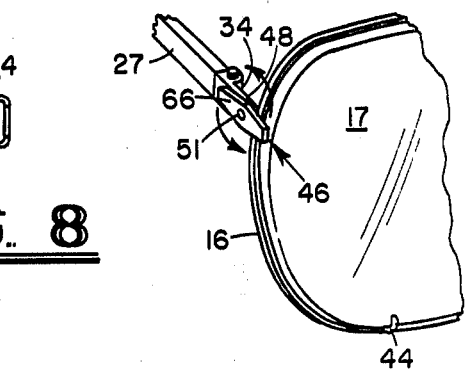
FIG. 8
FIG. 9
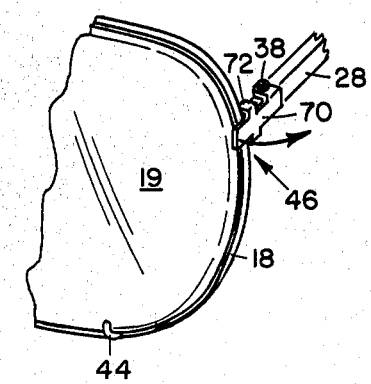
FIG. 10
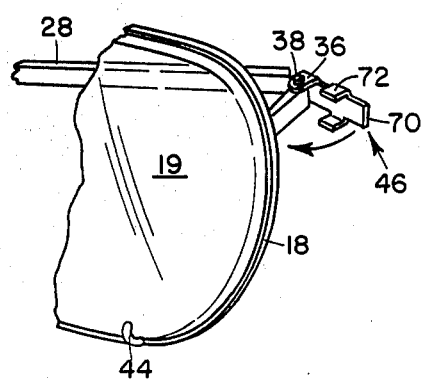
FIG. 11
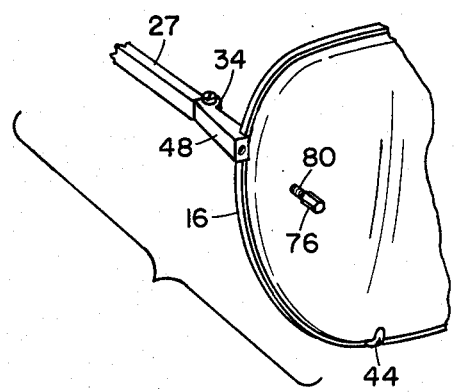
FIG. 12
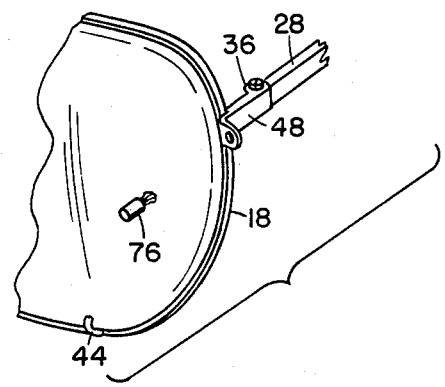
FIG. 13

EYEGLASS FRAME HAVING REMOVABLE LENSES

BACKGROUND OF THE INVENTION

1. Field of the Invention

This invention pertains to an improved design for eyeglass frames primarily intended for utilization with lenses of various types prescription, non-prescription, safety glasses or sunglasses. The eyeglass frames are constructed in a rather conventional manner insofar as lens frames and temple members are concerned. The modification resides in the manner of securing the lenses to the lens rings. The lens rings are constructed with stationary inner lens hooks, upper lens hooks, and lower lens hooks. These hooks are constructed and arranged to receive the detachable eyeglass lenses. These lenses are retained in position by movable temple lens latches mounted at the outer extremity of the lens ring on or adjacent the temple hinge or projection.

2. Description of the Prior Art

The most closely related patent, to the knowledge of applicant, is the recent U.S. Pat. No. to Matthias, 4,176,921. The Matthias patent employs a similar construction of lens rings and lens hooks. The Matthias patent utilizes a retaining clip mounted on the nose bridge with the clip tilting from a released position releasing the lenses to a closed position retaining the lenses. The distinction in design of this invention over the Matthias invention is the variation in positioning of the lens latch. The various species of the latches of this invention are all secured to the outer extremity of the lens frames in a position adjacent the temple or hinge.

SUMMARY OF THE INVENTION

The eyeglass frames having removable lenses incorporated in the invention of this disclosure utilize eyeglass frames having two lens rings of relatively conventional outer configuration. These two lens frames are attached in the conventional manner by a nose bridge and employ a conventionally constructed first and second pads and first and second temple members having ear loops. The variation in the construction of the eyeglass frames of this invention resides primarily in the manner of securing the eyeglass lenses to the lens rings. Attached to the portion of the lens rings adjacent the nose bridge consist of inner lens hook, upper lens hooks, and lower lens hooks securely attached to the lens rings projecting over and receiving and securing the eyeglass lenses. The temple lens latches utilized on each of the lens rings are movable from a lens securing position to a lens releasing position. Several concepts of temple lens latches are incorporated in the various species of the invention of this application.

In summary, the first species employs a tiltable catch; the second species a spring loaded catch; the third species a frictionally sliding projection; the fourth species a swing projecting arm; and the fifth species utilizes detachable retention pins projecting outward from the temple extension.

BRIEF DESCRIPTION OF THE DRAWINGS

For a detailed description of the construction of the eyeglass frame having removable lenses of this inventive concept, reference is made to the attached drawings wherein the construction of the preferred species and all related species are illustrated and will be described in the following detailed description.

FIG. 1 is a perspective view of an eyeglass frame having removable lenses incorporating the first species utilizing the tilt catch.

FIG. 2 is a fragmented, side view of lens ring and temple illustrating the tilt catch in the locked position retaining the lens in the lens ring. An upper and lower lens hook is illustrated.

FIG. 3 is a fragmented, front view of lens ring retaining a lens in position illustrating the tilt catch in the released position.

FIG. 4 is a fragmented, side view of temple hinge utilizing a spring loaded projecting retention pin.

FIG. 5 is a fragmented, top view of a lens ring, lens, and temple utilizing a spring loaded latch pin.

FIG. 6 is a fragmented, sectional view of the spring loaded latch pin.

FIG. 7 is a fragmented, side view of frictionally retained slide clip retaining a lens in position.

FIG. 8 is a front view of a slide clip for retaining lens in position.

FIG. 9 is a fragmented, side view of a lens retained by an embodiment or modification of a tilt catch of the first species.

FIG. 10 is a fragmented, side view of a swing clip constructed with an integral retention pin.

FIG. 11 is a fragmented view of the swing projecting arm with an integral latch pin in the open position.

FIG. 12 is a fragmented, side view of lens ring and temple with hinge employing a detachable retention pin.

FIG. 13 is a fragmented, side view of lens ring, temple, and hinge illustrating a modification of the detachable retention pin.

DETAILED DESCRIPTION OF THE PREFERRED EMBODIMENT

For a detailed description of the preferred embodiment and the various species, reference is made to the attached several views wherein identical reference characters will be utilized to refer to identical or equivalent components throughout the various views and the following description.

The construction of the eyeglass frames 14 are rather conventional as illustrated in FIG. 1. They utilize a first lens ring 16 retaining a first lens 17 and a second lens ring 18 retaining a lens 19. The two lens rings 18 and 19 are secured in an integral structure with a nose bridge 24 and the lens rings 18 and 19 are equipped with a first nose pad 25 and a second nose pad 26 of conventional construction. The eyeglass frames 14 include a first temple member 27 and a second temple member 28 having first and second ear loops 30 and 32. The temples 27 and 28 are attached to the eyeglass frames 14 utilizing a conventional construction for a first and a second temple hing 34 and 36. The temple members are secured to the eyeglass frame 14 by means of conventional hinge pins 38.

The variation in construction of eyeglass frames 14 of this invention resides in the manner in which the first and second lenses 17 and 19 are secured to the first and second lens rings 16 and 18. The lenses 17 and 19 are secured to the lens rings 16 and 18 by means of their sliding under and being grasped by inner lens hooks 40 and upper lens hooks 42 as well as lower lens hook 44. These various hooks project outward from the lens rings 16 and 18 and project over the lenses 17 and 19.

Engagement is constructed in a relatively loose, slidable, grasping contact. The first and second lenses 17 and 19 are locked into a relatively firm position on the lens rings 16 and 18 by means of a movable temple lens latch 46. The various species of this invention reside in the various configurations and constructions of the temple lens latch 46.

The preferred embodiment of this invention is illustrated in FIGS. 1-3, which consist of a temple extension 48 into which is formed or machined a latch slot 49. The latch arm 50 is tiltably mounted in the latch slot 49 and secured into position by means of a latch pin 51 which, in movement from a vertical position to a horizontal position, moving over a detent not shown. This construction provides a slight restriction to the rotation of latch arm 50 tending to retain the latch arm in the forward projecting position as illustrated in FIG. 1. In this configuration the lens is retained in engagement with the various lens hooks 40, 42, and 44. When the latch arm 50 projects forward as illustrated in FIG. 1, the lens cannot be removed from first lens ring 16 nor the second lens ring 18. If the lens arm 50 is tilted upward into a position relatively normal to temple members 37 and 38, FIG. 3, the first and second lenses 17 and 19 may be readily removed from the eyeglass frames 14. This readily detachable resecuring feature permits an interchangeability of lenses of varying densities or permits changing from the shaded sunglass type lens to the light amber shooting glass lens.

The second species of the invention is illustrated in FIGS. 4, 5 and 6. The construction visualized in this embodiment incorporates a latch slide 56 in lieu of the tilting latch arm 50 described in the species above. The latch slide 56, as visualized, is illustrated in detail in FIGS. 4 and 6. Latch slide 56 is mounted in a structure somewhat equivalent to temple extension 48. Temple extension 48 is constructed with a recess to which is mounted a latch spring 58 which springs loads latch pin 60 in the extended position. A small detent may be provided in the temple extension 48 to retain the latch pin 60 in a desired position.

Another embodiment of the invention is illustrated in FIG. 7, which is referred to as a slide clip 64. This configuration of the invention visualizes a slide clip 64 having a configuration generally as illustrated in FIG. 8 which permits the slide clip 64 moving along the temple extension 48 from a lens latched position as illustrated in FIG. 7 and when retracted toward the temple hinge 34, 36 to release the lenses 17 and 19.

Another configuration of the device is as illustrated in FIG. 9. This is considered to be a modification of the first species of the invention as previously described. A rotating like arm comprising the tilt clip 66 is mounted on the exterior of temple extension 48 by means of a latch pin 51.

Another configuration of the device of this invention is illustrated in FIGS. 10 and 11. This device comprises a swing clip 70 which is tiltably mounted on the first and second temple hinges 34 and 36 pivotally retained by the hinge pins 38. In this configuration of the device the lenses 17 and 19 are locked in position as illustrated in FIG. 10. When it is desired to change or release the lenses, the swing clip 70 is moved to the position illustrated in FIG. 11. The manner in which the swing clip 70 is retained in position on the temple extension 48 is by means of a friction lock 72 which is forced over and grasped temple extension 48.

Other methods of retaining the lenses 17 and 19 in position are illustrated in FIGS. 12 and 13. A small, threaded aperture can be machined in the end of temple extension 48. A retention pin 76 engages the temple extension 48 by means of retention pin threads 78 in the temple extension 48 threadably engaging the retention pin screw threads 80.

OPERATION OF THE DEVICE

The purpose of this invention is to permit a changing of the first and second lenses 17 and 19 as desired by the user. Devices of this invention, other than the species utilizing the threaded retention pin 76 as illustrated in FIGS. 12 and 13, permit the changing, if desired, of the lenses 17 and 19 without removing the eyeglass frame 14 from the wearer. Although the device of this invention is visualized primarily for utilization in sunglasses or shooting glasses wherein various densities of lenses might be utilized, all variations in lenses are possible, such as a shifting from a prescription lens to a non-prescription lens, or the interchangeability of prescription lenses. Polarized glass might be utilized or various tints or shades interchangeable. The device of this invention, in effect, provides a slot into which the lenses 17 and 19 project and they are latched into position by a temple lens latch 46 of various configurations retaining the lenses 17 and 19 in position from the side of the lens rings 16 and 18 adjacent the temple members 27 and 28. The construction of the device of this invention has been described in detail in five embodiments. What is desired to claimed is all modifications and adaptations of this invention not departing from the scope of equivalents as defined in the appended claims.

I claim:

1. An eyeglass frame adapted to receive removable lenses comprising:
    a. a lens ring,
    b. multiple lens hooks secured to said lens ring, said hooks and said lens ring adapted to receive and retain and eyeglass lens,
    c. temple means secured to said eyeglass frame,
    d. a temple extension member intermediate said lens ring and said temple member, and
    e. a temple lens latch clearly visible from a front of said eyeglass frame and constructed in association with said temple extension adapted to retain a lens on said lens ring in association with said multiple lens hooks, said temple lens latch abutting an outer periphery of said lens to allow said lens to be inserted or removed in a direction perpendicular to said outer edge of said lens ring and from a front of said eyeglass frame,
    f. said temple lens latch including a latch arm tiltably mounted on said temple extension, said latch arm movable from a first position retaining a lens on said lens ring and movable to a second position releasing said lens.

2. An eyeglass frame adapted to receive removable lenses comprising:
    a. a lens ring,
    b. multiple lens hooks secured to said lens ring, said hooks and said lens ring adapted to receive and retain an eyeglass lens,
    c. temple means secured to said eyeglass frame,
    d. a temple extension member intermediate said lens ring and said temple member, and
    e. a temple lens latch clearly visible from a front of said eyeglass frame and constructed in association with said temple extension adapted to retain a lens on said lens ring in associated with said multiple lens hooks, said temple lens latch abutting an outer periphery of said lens to allow said lens to be inserted or removed in a direction perpendicular to said outer edge of said lens ring and from a front of said eyeglass frame, f. said temple lens latch including a slot constructed in said temple extension and a latch arm tiltably mounted in said slot.

3. An eyeglass frame adapted to receive removable lenses comprising:
 a. a lens ring,
 b. multiple lens hooks secured to said lens ring, said hooks and said lens ring adapted to receive and retain an eyeglass lens,
 c. temple means secured to said eyeglass frame,
 d. a temple extension member intermediate said lens ring and said temple member,
 e. a temple lens latch clearly visible from a front of said eyeglass frame and constructed in association with said temple extension adapted to retain a lens on said lens ring in association with said multiple lens hooks, said temple lens latch abutting an outer periphery of said lens to allow said lens to be inserted or removed in a direction perpendicular to said outer edge of said lens ring and from a front of said eyeglass frame,
 f. a latch slide mounted integral of said temple member,
 g. a latch pin projecting from said latch slide, and
 h. a spring mounted in said temple extension urging said latch slide to a position securing a lens on said lens ring.

* * * * *